(12) United States Patent
Sakizchi et al.

(10) Patent No.: US 11,415,231 B2
(45) Date of Patent: Aug. 16, 2022

(54) FLOW REGULATING VALVE

(71) Applicants: Vadim M. Sakizchi, Moscow (RU); Snezhana V. Sobolevskaia, Moscow (RU)

(72) Inventors: Vadim M. Sakizchi, Moscow (RU); Snezhana V. Sobolevskaia, Moscow (RU)

(*) Notice: Subject to any disclaimer, the term of this patent is extended or adjusted under 35 U.S.C. 154(b) by 0 days.

(21) Appl. No.: 17/052,762

(22) PCT Filed: Jun. 5, 2019

(86) PCT No.: PCT/RU2019/000405
§ 371 (c)(1),
(2) Date: Nov. 3, 2020

(87) PCT Pub. No.: WO2019/212392
PCT Pub. Date: Nov. 7, 2019

(65) Prior Publication Data
US 2021/0180704 A1    Jun. 17, 2021

(30) Foreign Application Priority Data

May 3, 2018 (RU) .......................... RU2018116396

(51) Int. Cl.
*F16K 3/02* (2006.01)
*F16K 5/12* (2006.01)

(52) U.S. Cl.
CPC ............... *F16K 5/12* (2013.01); *F16K 3/029* (2013.01)

(58) Field of Classification Search
CPC ... F16K 3/029; F16K 3/03; F16K 3/12; F16K 3/14
(Continued)

(56) References Cited

U.S. PATENT DOCUMENTS 1,999,699 A * 4/1935 Koch ...................... E21B 33/06
                                                    251/1.3
2,132,037 A * 10/1938 MacClatchie ......... E21B 33/062
                                                    251/1.3
(Continued)

FOREIGN PATENT DOCUMENTS

DE    19707534 A1    5/1998
RU    2373447 C1    11/2009
(Continued)

OTHER PUBLICATIONS

International Search Report from PCT/RU2019/000405, dated Jun. 5, 2019, dated Sep. 5, 2019.
(Continued)

*Primary Examiner* — Hailey K. Do
(74) *Attorney, Agent, or Firm* — Patentbar International PC

(57) ABSTRACT

A throttling flow control valve that allows to adjust an amount of flow by adjusting a size of a flow path through the valve comprises a body having inlet and outlet branch pipes with through passages, and a control element having movable regulating teeth each having an individual actuator and fixed regulating teeth. The movable regulating teeth and fixed regulating teeth each have a streamlined shape ending with a symmetrical wedge. The control element provides a throttling zone having a cross section in a shape of a multi-point star. By action of individual actuators, movable regulating teeth move on fixed regulating teeth, which results in efficient flow control due to varying of the throttling zone area.

1 Claim, 3 Drawing Sheets

(58) Field of Classification Search
USPC .................................................. 251/1.2, 1.3
See application file for complete search history.

(56) References Cited

U.S. PATENT DOCUMENTS

| | | | |
|---|---|---|---|
| 3,136,525 A | 6/1964 | Creasser | |
| 5,524,863 A | 6/1996 | Davis | |
| 5,680,889 A | 10/1997 | Boger | |
| 6,271,486 B1* | 8/2001 | Franklin | B65D 90/585 |
| | | | 177/105 |
| 2015/0083943 A1* | 3/2015 | Shah | E21B 33/061 |
| | | | 251/1.3 |

FOREIGN PATENT DOCUMENTS

| | | |
|---|---|---|
| RU | 2382924 C1 | 2/2010 |
| RU | 2682468 C2 | 3/2019 |

OTHER PUBLICATIONS

Flowserve valves, https://www.flowserve.com/ru/node/346.
Mokveld Valve, https://mokveld.com/en/axial-control-valve.

* cited by examiner

FLOW REGULATING VALVE

RELATED APPLICATIONS

This application is a U.S. National Stage Under 35 USC § 371 of International Application PCT/RU2019/000405, filed on Jun. 5, 2019, which in turn claims priority to Russian Patent Application RU 2018116396, filed May 3, 2018, both of which are incorporated herein by reference in their entirety.

FIELD OF THE INVENTION

The invention relates to devices for control of parameters of processing medium flows and can be used in equipment of gas, oil, chemical, power engineering, metallurgical and coal industries.

BACKGROUND OF THE INVENTION

The arrangement of regulating valve is known containing the body with inlet and outlet branch pipes with passage openings, the ball rotary gate with a V-profiled narrowed passage opening, and the ball rotary valve actuator (see http://flowserve.com.ru_RU/Products/Valves/Control/Ball)/.

A disadvantage of this arrangement is non-observance of axial symmetry of the controlled flow in the V-profile passage aperture, which causes increase of the water passage hydraulic resistance because of a significant narrowing and widening.

Saddle regulator valves are most frequent. Their disadvantages are a significant disturbance of the pumped medium flow due to variation of the passage shape and a large number of structural elements which disturb regular movement.

The second in terms of frequency of use is the design of a regulator valve by Mokveld Valves by, that is, Mokveld valve. It is an axial valve containing internal and external bodies performed as a single casting, a piston with a stem which moves along the valve longitudinal axis. The piston moves be means of a gear mechanism consisting of two toothed racks positioned to each other at 90° and being a part of the piston stem and the valve spindle, respectively. The gear mechanism is protected against effects of the processing medium by double primary seals installed on the piston stem and in its guide.

This arrangement is characterized with the following disadvantages:
- traversing speed of the control mechanism is limited due to possibility of generation of an impulse wave during the piston movement due to the significant rated actuation time;
- location of the regulating part in the middle of the flow leads to deformation of regular movement, especially of gases movement;
- control is realized due to movement of the piston, which, apart from limitation of the passed medium amount, changes the nature of this movement and results in additional losses of the flow energy;
- the gas flow changes its direction when flowing around the operating mechanism, and two more times at the angle about 90 deg when passing the perforation, with significant losses of the flow energy (not less than 30%);
- hermeticity of closing of the regulator valve is achieved due to full displacement of the piston beyond perforation boundaries and can be disturbed in case of ingress of foreign objects when the pumped medium is polluted;
- the regulator valve has a definite direction of the flow movement, that is, it cannot work in both directions;
- all elements of the arrangement are exposed to the flow effect, which leads to their quick wear.

SUMMARY OF THE INVENTION

The goal of the current invention is increase of the valve actuating speed, decrease of energy losses, enhancing of resistance to wear, longevity and repairability.

The goal is achieved by the throttling flow control valve comprising a body with inlet and outlet branch pipes with passage openings and a control element that provides a throttling zone and has movable regulating teeth and fixed regulating teeth. Each movable regulating tooth and each fixed regulating tooth has a streamlined form ending with a symmetrical wedge, whereas the value of the wedge-shaped part angle is determined as 360/n where n is a number of movable regulating teeth. Each movable regulating tooth possesses an individual actuator, whereas the throttling zone provided by the control element has a cross section in a shape of a multi-point star.

DETAILED DESCRIPTION OF THE PREFERRED EMBODIMENTS

Figure 1:
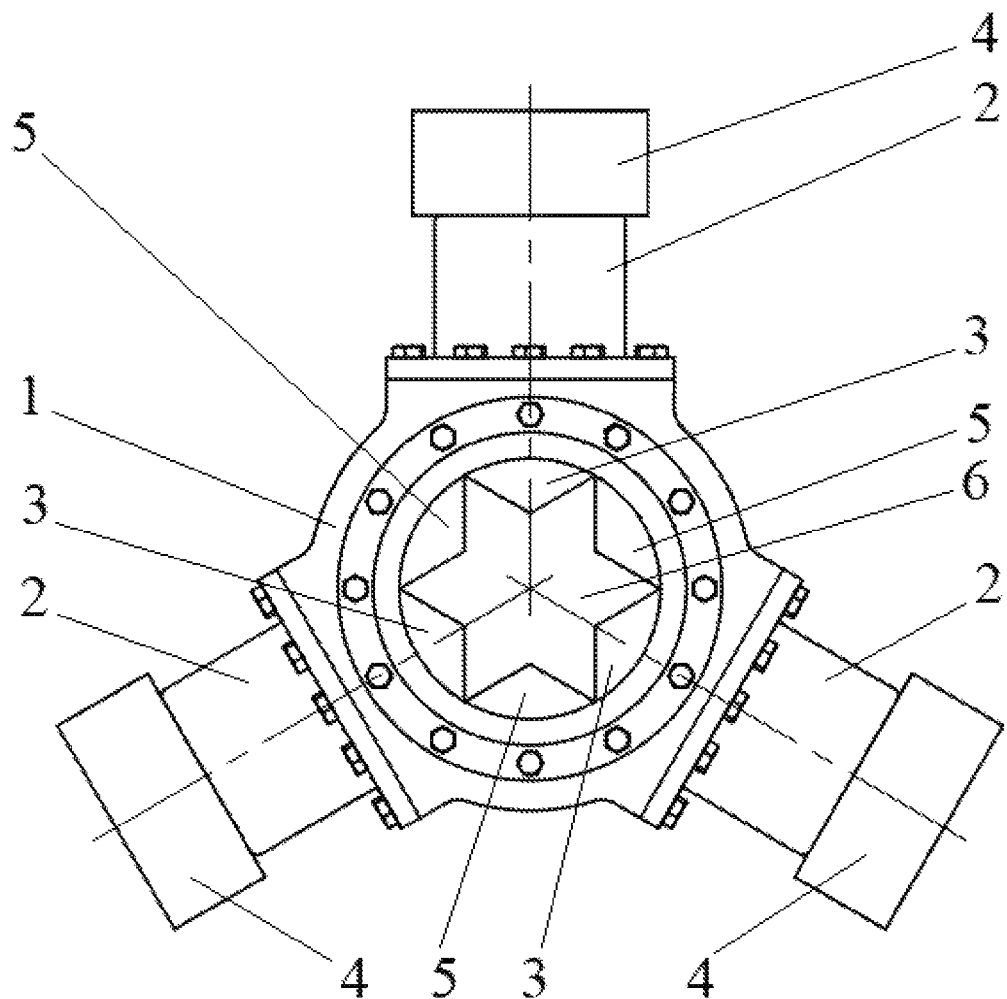
In FIG. 1 of the attached drawings, a general view of a present flow control valve is presented.
Figure 2:
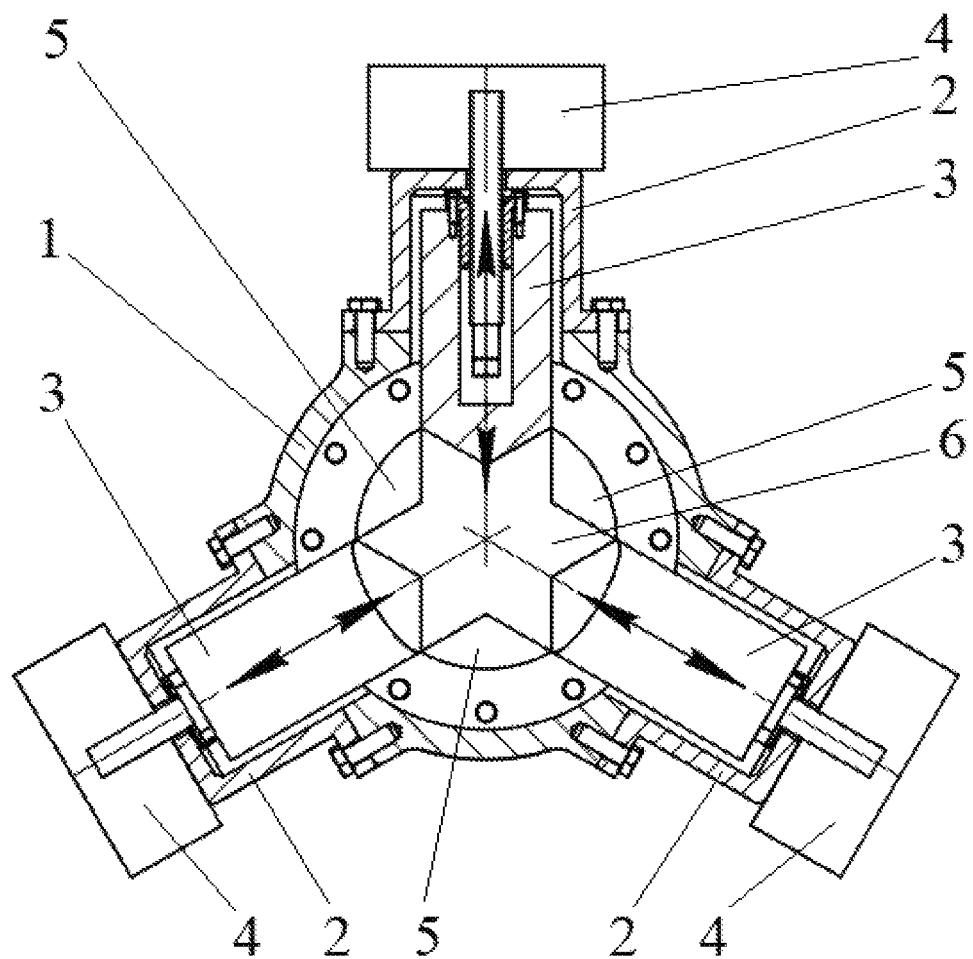
In FIG. 2 shown is vertical cross-sectional view of the same.
Figure 3:
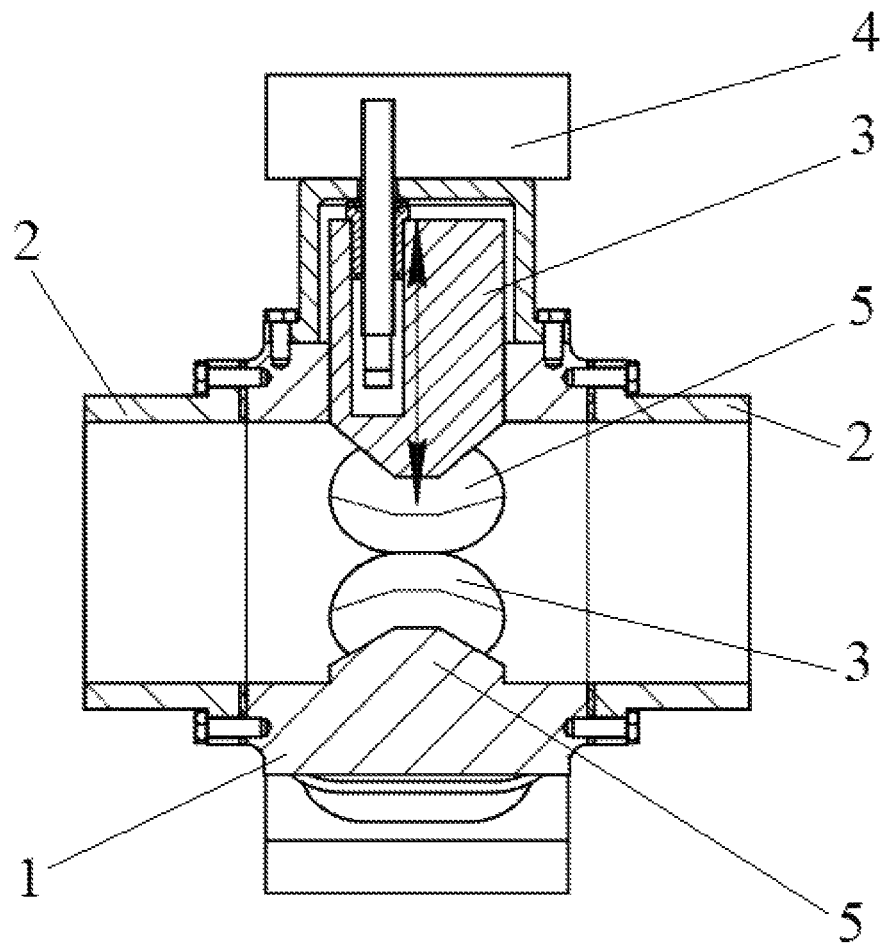
In FIG. 3—shown is horizontal cross-sectional view of the same.

The throttling flow control valve comprises body 1 with inlet and outlet branch pipes 2 and a control element having movable regulating teeth 3, each of the movable regulating teeth 3 having an individual actuator 4. The control element further comprises fixed teeth 5. Each movable regulating tooth and each fixed regulating tooth has a streamlined form ending with a symmetrical wedge, wherein an angle of the wedge is defined as 360/n, where n is a number of the movable regulating teeth. As a result of such arrangement, the control element provides a throttling zone 6 that has a cross section in a shape of a multi-point star.

The flow control valve works as follows.

By the action of individual actuators 4, movable regulating teeth 3 move on fixed regulating teeth 5; as a result of this movement, control of the flow is realized due to variation of the passage section area (or throttling zone) 6. Operation of actuators 4 is synchronized by means of certain devices not described herein.

Implementation of the flow control valve with independent actuators of movable teeth allows:

1. When diameters of passage section exceed 500 millimeters, to make this arrangement independent on mechanical parts of the actuator which are large both in weight and overall dimensions;
2. Speed of performing of control actions is significantly higher than that at the mechanical transmission of movement, which is also especially actual at large diameters of the passage section.

The invention claimed is:

1. A throttling flow control valve comprising:
   a body having inlet and outlet branch pipes with passage openings; and
   a control element having movable regulating teeth and fixed regulating teeth, wherein the control element provides a throttling zone;
   wherein each movable regulating tooth and each fixed regulating tooth has a form ending with a symmetrical wedge, wherein an angle of the symmetrical wedge is defined as $360/n$, where n is a number of the movable regulating teeth,
   wherein each movable regulating tooth has an individual actuator, and
   wherein the throttling zone provided by the control element has a cross section in a shape of a multi-point star.

* * * * *